Sept. 15, 1936.   P. VAN SITTERT   2,054,346
MULTIPLE-WAY VALVE
Filed Oct. 26, 1934   3 Sheets-Sheet 1

PAUL VAN SITTERT
INVENTOR

BY
ATTORNEY

Sept. 15, 1936.   P. VAN SITTERT   2,054,346
MULTIPLE-WAY VALVE
Filed Oct. 26, 1934   3 Sheets-Sheet 2
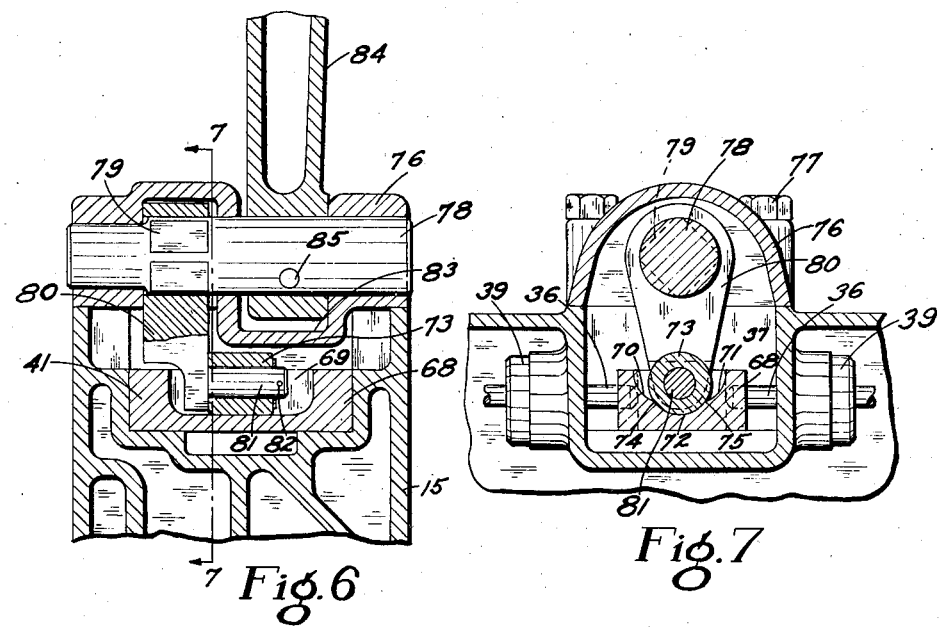
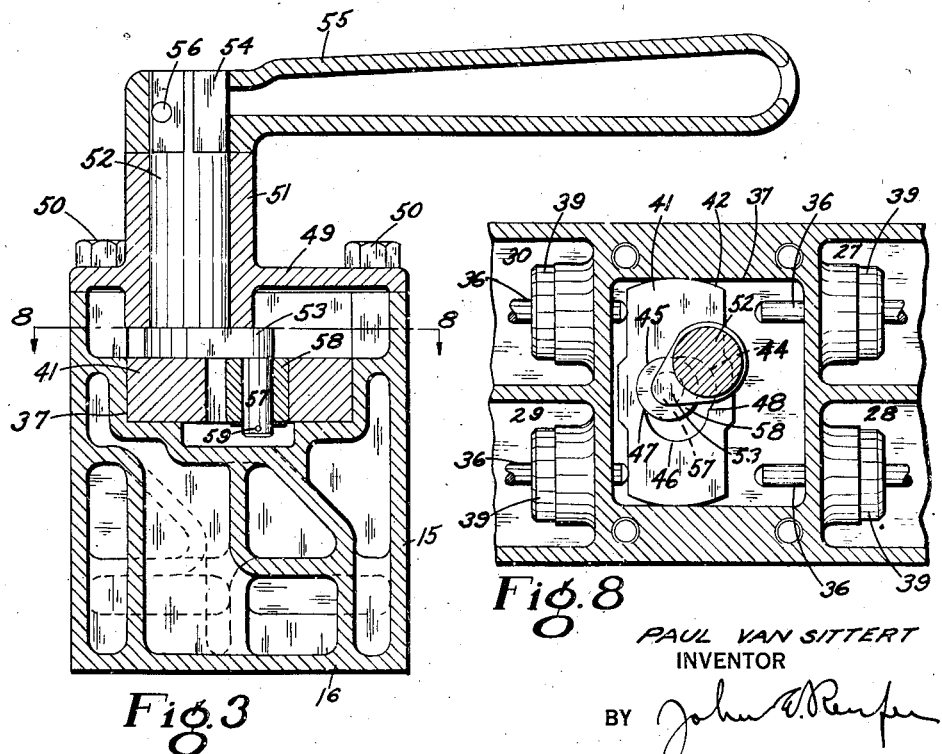
PAUL VAN SITTERT
INVENTOR
BY
ATTORNEY Sept. 15, 1936.  P. VAN SITTERT  2,054,346
MULTIPLE-WAY VALVE
Filed Oct. 26, 1934   3 Sheets-Sheet 3
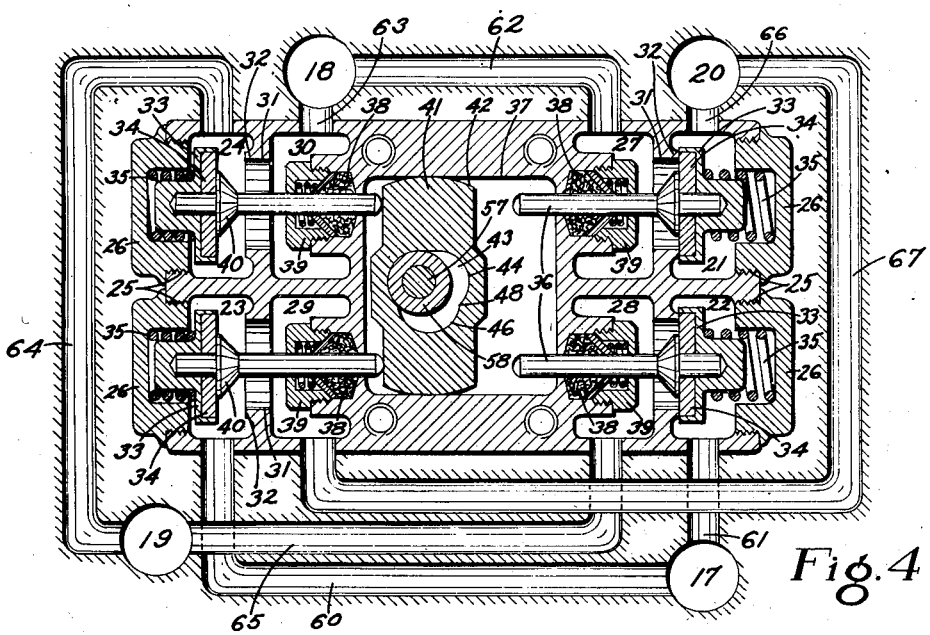
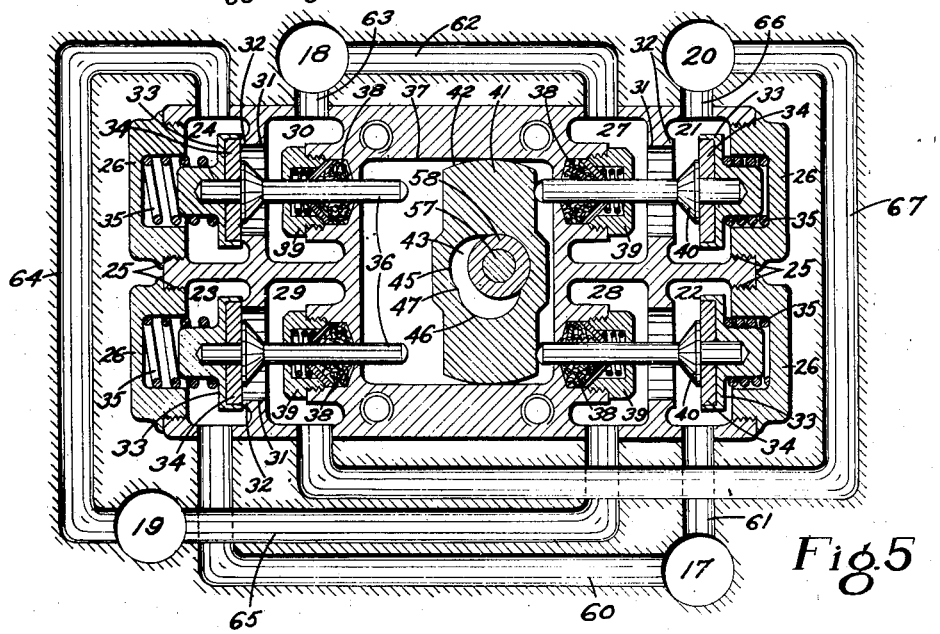
PAUL VAN SITTERT
INVENTOR
ATTORNEY Patented Sept. 15, 1936

2,054,346

UNITED STATES PATENT OFFICE 2,054,346

MULTIPLE-WAY VALVE

Paul Van Sittert, Cleveland, Ohio, assignor to The Cleveland Pneumatic Tool Company, Cleveland Ohio, a corporation of Ohio Application October 26, 1934, Serial No. 750,114

10 Claims. (Cl. 277—1)

This invention relates broadly to valves, but more particularly to an improvement in multiple-way valves.

One object of this invention is to produce a multiple-way valve of simple design and economic of manufacture wherein the movable parts thereof are accessible without necessitating the disconnection of the many conduits attached to the valve housing or casing, thus facilitating the inspection or service of these parts and thereby reducing the cost of maintenance.

Another object of this invention is to produce a multiple-way valve of simple and sturdy construction wherein all the movable parts are enclosed within the valve casing for protection against dust or grit and the deleterious effect thereof.

Another object of this invention is to provide a multiple-way valve with a simple and efficient device capable of locking the valve actuating mechanism in various operating positions.

Other objects and advantages more or less ancillary to the foregoing and the manner in which the various objects are attained, reside in the specific construction and aggroupment of the elements peculiar to this structure, as will become apparent from a more complete examination of this specification, in the claims of which there are assembled certain specific combinations of parts and specific constructions indicative of the scope and spirit of the invention.

In the drawings which illustrate a preferred embodiment of the invention,

Fig. 3 is a cross sectional view taken in a plane indicated by line 3—3 in Fig. 1.

Fig. 4 is a diagrammatical view showing the valves in one operative position.

Fig. 5 is a view similar to Fig. 4 illustrating the valves in the other operative position.

Fig. 6 is a view similar to Fig. 3, illustrating a modification of the locking mechanism shown in Fig. 3.

Fig. 7 is a cross sectional view taken in a plane indicated by line 7—7 in Fig. 6.

Fig. 8 is an enlarged cross sectional view taken in a plane indicated by line 8—8 in Fig. 3.

Figure 2:
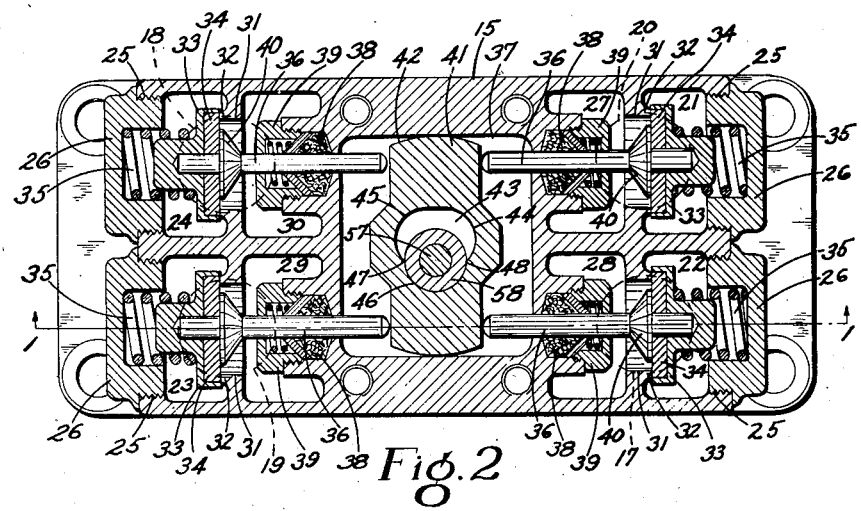
Fig. 2 is a cross sectional view taken in a plane indicated by line 2—2 in Fig. 1.

Referring to the drawings in which like symbols designate corresponding parts through the several views, 15 represents the valve housing having bores or connections 17, 18, 19, and 20 which are adapted to receive the end of four conduits for admitting or exhausting pressure fluid to or from the valve as will be explained hereinafter.

Located within the upper portion of the housing 15, there are four identical valve chambers 21, 22, 23, and 24 each having a screw threaded port 25 leading to the exterior of the housing and adapted to receive a plug 26. Leading from each of the above mentioned chambers into individual chambers 27, 28, 29, and 30 formed within the housing 15, there is a relatively large port 31. The bottom of each of the valve chambers adjacent the port 31 opening therein is properly machined to constitute an annular valve seat 32. Located within each of the valve chambers, there is a cap 33 formed with a counterbore adapted to receive a washer or valve 34 capable of engagement with the annular valve seat 32. This washer or valve is preferably made of resilient material such as rubber to assure a fluid tight joint with the valve seat 32, against which it is constantly urged by the effort of a compression spring 35, having one end seated on the cap 33 while the other end thereof is seated within a counterbore formed within the plug 26. Mounted within each of the caps 33, there is one end of a valve stem 36, while the other end of each of the four stems extends into an enlarged chamber 37 formed centrally within the upper portion of the housing 15. To prevent the leakage of the fluid from the chambers 27, 28, 29, and 30 into the enlarged chamber 37, each of the former is provided with a counterbore having a stuffing box 38 therein through which the valve stem 36 is free to slide. The appurtenant parts of the stuffing box are maintained in operative position relative the valve stem 36 by a plug 39 secured in screw tight engagement within the counterbore formed within the last mentioned chambers. Intermediate its ends, the valve stem 36 is formed with an enlarged head 40 capable of abutting engagement with the washer or valve 34.

Slidably mounted within the enlarged chamber 37, there is a substantially rectangular block 41. The small end walls of the block engaging the internal wall of the enlarged chamber 37 are arcuated as at 42 to facilitate the slidable movement of the block and prevent the possible binding of the latter within the enlarged chamber 37. Accurately machined through the central portion of the block 41, there is an arched slot 43 terminated by arcuated end portions 44 and 45 of a radius identical to that of the arch 46, which is located in equidistant relation with the ends of the slot. The intersections of the arch 46 with the arcuated ends of the slot form a duality of protuberances or edges 47 and 48, the purpose of which will be explained later. The enlarged chamber 37 is closed by a cover or cap 49 secured to the upper wall of the housing 15 by screws 50. This cap is provided with a vertical sleeve 51 formed integral therewith in offset relation with the slot 43 of the block 41. Rotatably mounted within the sleeve 51, there is one arm 52 of a crank 53. This arm is provided with a square end portion 54 protruding from the sleeve 51 to receive a handle 55 secured thereto by a pin 56. The other arm 57 of the crank 53 has rotatably mounted thereon a roller 58 secured thereon against longitudinal movement by a pin 59. The roller 58 is adapted to fit within the arcuated ends 44 and 45, and the arch 46 of the slot 43 in a manner and for the purpose which will be explained later.

Figure 1:
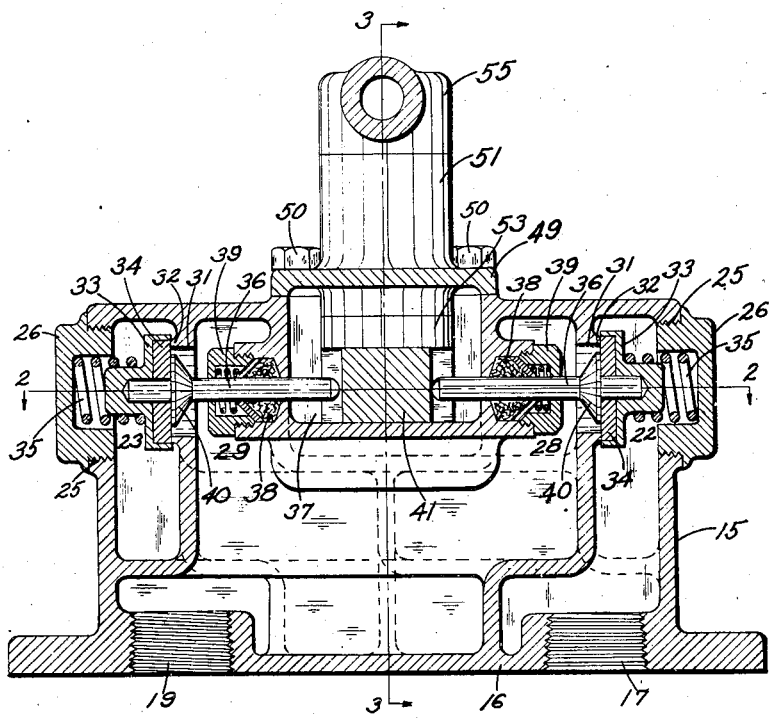
Fig. 1 is a longitudinal sectional view of the valve assembly, taken in a plane indicated by line 1—1 in Fig. 2.

Cored within the housing 15, there is a system of passages affording the communication of the connections 17, 18, 19, and 20, with their respective chambers. To facilitate the explanation and understanding of the operation of the present construction, these passages are shown diagrammatically in Figs. 4 and 5, wherein the circles 17, 18, 19, and 20 represent the connections shown in Figs. 1 and 2. Referring to Figs. 4 and 5, it will be seen that the connection 17 is capable of communication with the valve chamber 23 through a passage 60, and with the valve chamber 22 through a passage 61. The connection 18 is similarly capable of connection with the chamber 27 through a port or passage 62, and with the chamber 30 via a port 63. Referring to the connections 19 and 20, it will be seen that the former is capable of communication with the valve chamber 24 through a port 64, and with the chamber 28 through a port 65, while the connection 20 is in constant communication with the valve chamber 21 via a passage 66, and with the chamber 29 via a passage 67.

In the modification of the invention shown in Figs. 6 and 7, the rectangular block 68 which is slidably mounted within the enlarged chamber 37, is provided with a longitudinally disposed groove 69, the side walls 70 and 71 together with the bottom 72 thereof, being arcuated to receive a roller 73. The intersections of the bottom wall 72 with the side walls of the groove 71 forms a duality of edges 74 and 75 similar to the edges 47 and 48 shown in Fig. 2. The enlarged chamber 37 is closed by a cap 76 which is secured to the upper wall of the valve housing by screws 77. Transversally disposed through the cap 76, there is a rotatable shaft 78 formed with a square portion 79 and adapted to receive a lever 80 locked thereon against relative rotation. This lever is terminated by an arm 81 located longitudinally within the groove 69, and adapted to rotatably receive the roller 73 which is locked thereon against longitudinal movement by a pin 82. Intermediate the ends of the shaft 78, the cap 76 is formed with a dip 83 adapted to accommodate the socket end of a handle 84 secured to the shaft 78 by a pin 85. It will be seen that with the construction shown in Figs. 6 and 7, the handle 83 is positioned for rotation in a vertical plane, while in the construction shown in Fig. 3, the handle 50 is located for rotation in an horizontal plane.

In the operation of the device, pressure fluid may be admitted from its source of supply in the connection 17, from where it is free to flow in the valve chambers 22 and 23. When the block 41 is positioned as shown in Fig. 2, that is in spaced relation with the end of the valve stems 36, the roller 58 is located within the arch 46. When it is desired to admit pressure fluid from the connection 17 into the connection 20 from where it may flow into a fluid actuated mechanism, the handle 55 may be rotated in a clockwise direction, thus causing through the crank 53, the rotary movement of the arm 57 and roller 58 toward the left of the Figs. 4 and 5. The roller 58 engaging the internal wall of the arch 46 will cause the slidable movement of the block 41 and the consequential engagement of the latter with the stems 36 of the valves located in the valve chambers 23 and 24, for forcing the valves in said chambers away from their respective seat or in open position. The pressure fluid previously admitted into the inlet chamber 23 through the port 60 is now free to flow therefrom into the connection 20 via the enlarged port 31, the chamber 29 and port 67. Simultaneously, the pressure fluid previously admitted into the connection 19 is free to exhaust therefrom via the port 64, the valve chamber 24, into the chamber 30 via the enlarged port 31, from where it will flow into the connection 18 through the port 63. The connection 18 is simply an exhaust port to which may be affixed a conduit for conveying the exhausting fluid away from the valve operator.

The combination of the block 41 slidably guided within the enlarged chamber 37 together with the roller 58 which is mounted within the specially designed slot 43 and the crank 53, may be said to constitute a toggle mechanism by which the block 41 may be moved and locked in operating position as shown in Fig. 8. In this instance, the edge 47 of the slot 43 is located substantially in a vertical plane passing through the center of the two arms 52 and 57 of the crank 53. However, in practice it has been found advisable to machine the slot 43 in a manner causing the edge 47 to be located somewhat on the side of the vertical plane adjacent the arch 46, the edge forming thereby a little hump cooperating with the roller 58 for assisting in the locking of the block 41 in operative position. When the block 41 is positioned as illustrated in Figs. 4 and 8, the pressure of the valve stems 36 exerted on the block 41 due to the effort of the compression springs 35 located within the chambers 23 and 24, will tend to shift the block 41 together with the roller 58 in the vertical or inoperative position shown in Fig. 2. The pivotal movement of the roller 58 around the center axis of the crank arm 52 imparted thereto by the block 41, would obviously cause the transversal movement of the block 41, and since this transversal movement is prevented by the engagement of the small ends 42 of the block with the inner wall of the enlarged chamber 37, the slidable movement of the block 41 in a vertical position is thus prevented. The pressure of the valve stems on the block 41 tending to shift the latter in a neutral position, actually causes the block 41 to be locked in operative position.

When it is desired to close the valves within the chambers 23 and 24, the block 41 may be shifted in the position shown in Fig. 2 by simply rotating the handle 55 in a counterclockwise direction. In this instance, the pivotal movement imparted to the roller 58 by the crank 53 causes the former to be moved out of the arcuated end 45 of the slot 43, while the block 41 is slid in a corresponding direction by the action of the spring pressed valve stems 36 thereon. After the roller has passed over the edge 47 and is in engagement with the side wall of the arch 46 within which it is finally located, the roller together with its appurtenant parts, is moved by the block 41 in the neutral or inoperative position shown in Fig. 2.

When it is desired to admit the pressure fluid from the inlet connection 17 into the connection 19, the valve handle may be rotated in a counterclockwise direction, thus causing the slidable movement of the block 41 from the position shown in Fig. 2 to the position shown in Fig. 5, and the consequential opening of the valves 34 located in the chambers 21 and 22. The pressure fluid previously admitted from the connection 17 into the chamber 22 through the port 61, is now free to flow into the connection 19, via the enlarged aperture 31, the chamber 28, and port 65. Simultaneously, the pressure fluid previously admitted in the connection 20, is now free to flow into the exhaust port or connection 18 via the port 66, chamber 21, enlarged aperture 31, chamber 27 and port 62. The block 41 is locked in the position shown in Fig. 5 in the manner previously explained, regarding its position shown in Figs. 4 and 8, and it may again be shifted in a neutral position by simply rotating the handle 55 in a clockwise direction.

It is to be understood that to the connections 19 and 20 may be affixed individual conduits capable of conveying the pressure fluid to a fluid actuated mechanism. Assuming this mechanism to comprise a cylinder having a piston reciprocable therein, the pressure fluid may be admitted on one side of the piston through the connection 19, while the pressure fluid from the other side of the piston is free to exhaust through the connection 20. It will be noted that when two of the four valves 34 are in open position, the other two are subjected to the action of the pressure fluid together with the action of the compression spring thereon for assuring a fluid tight engagement of the valves with their respective seats.

The operation of the mechanism shown in Figs. 6 and 7 being identical to that previously described, no further explanation is thought necessary other than directing the attention to the fact that in this modified construction, the handle 84 is rotatable in a vertical plane, while the handle 55 is rotatable in a horizontal plane.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a valve mechanism, the combination of a casing enclosing two pairs of valves slidably mounted therein, all of said valves being located within a single plane with one pair disposed in opposition to the other pair thereof, an individual valve seat for each of said valves, means associated with each of said valves for normally maintaining it in forcible engagement with its respective valve seat, and means including a longitudinally slidable member enclosed within said casing whereby each pair of said valves may alternatively be shifted and maintained away from their respective valve seats.

2. In a valve mechanism, the combination of a casing having passages therein and enclosing two pairs of valve members movable to open or closed positions relative to said passages, means exerting pressure on each of said valve members for constantly urging the latter toward a closed position, an element movable within said casing slidable between said pairs of valve members and capable of alternative engagement with one or the other pair thereof for shifting it to an open position, and means associated with said element for locking the latter against slidable movement at substantially each end of the movement thereof, thereby causing the valve members in engagement therewith to be held in open position.

3. In a valve, the combination of a casing having a passage therein, a valve member movable within said casing to open or closed position relative to said passage, means associated with said valve member for constantly urging the latter toward a closed position, a mechanism for shifting and holding said valve member in an open position, said mechanism comprising an element slidably guided within said casing and engageable with said valve member, a pivotally movable member having a roller carried thereby for movement therewith, and a slot within said element having an arched surface with which said roller is capable of frictional engagement for sliding and locking said element in one position, causing thereby said valve member to be shifted and maintained in an open position.

4. In a valve mechanism, the combination of a housing having passages therein, a duality of valve members within said housing movable in open or closed position, means constantly exerting pressure on said valve members for normally maintaining the same in closed position relative to said passages, an element within said housing slidable between said valve members and capable of alternative engagement therewith for shifting and maintaining the same in open position, and locking means associated with said element for maintaining the latter at substantially either end of its slidable movement for holding one or the other of said valve members in open position, the operation of said locking means depending upon the pressure constantly exerted on the valve member engaged by said element.

5. In a valve mechanism, the combination of a casing having passages therein and enclosing two pairs of valve members movable to open or closed position relative to said passages, means exerting pressure on each of said valve members for constantly urging the latter toward a closed position, an element within said casing slidable between said pairs of valve members and capable of alternative engagements with on or the other pair thereof for shifting it to open position, a handle exteriorly of said casing, a connection between said handle and element whereby slidable movement is imparted to the latter upon rotation of the former, and means included in said connection for locking said element against slidable movement at substantially each end of the travel thereof, causing thereby the valve members in engagement therewith to be held in open position.

6. In a valve mechanism, the combination of a casing having a passage therein, a valve member movable within said casing to open or closed position relative to said passage, means associated with said valve member for constantly urging the latter toward a closed position, a mechanism for shifting and holding said member to an open position including an element slidable within said casing and engageable with said valve member, a handle exteriorly of said casing, a crank arm connection between said handle and element whereby slidable movement is imparted to the latter upon rotation of said handle, and means responsive to the engagement of said crank arm with said element for locking the latter in said valve member open position.

7. In a valve mechanism, the combination of a casing having a passage therein, a valve member movable within said casing to open or closed position relative to said passage, means associated with said valve member for constantly urging the latter toward closed position, a mechanism for shifting and holding said valve member to an open position including an element slidable within said casing and engageable with said valve member, a handle exteriorly of said casing, a crank arm connection between said handle and element whereby slidable movement is imparted to the latter upon rotation of said handle, a slot within said element wherein one end of said crank arm is capable of travel while imparting slidable movement to said element, said slot arranged and disposed in a manner preventing the travel aforesaid at a predetermined position of said element, causing thereby the latter to be locked in a position resulting in the opening of said valve member.

8. In a valve mechanism, the combination of a casing having passages therein, a duality of valve members movable within said casing to open or closed position relative to said passages, means associated with said valve members for normally maintaining the same in closed position relative to said passages, an element within said casing slidable between said valve members and capable of alternative engagement therewith for shifting the same to open position, a rotatable handle exteriorly of said casing, and a movement transforming device sealed within said casing including connecting means between said handle and element whereby slidable movement is imparted to said element upon rotation of said handle.

9. In a valve mechanism, the combination of a casing enclosing two sets of valve members slidable within a single plane with one set disposed in opposition to the other set thereof, an individual valve seat for each of said valve members, means associated with each valve member for normally maintaining it in forcible engagement with its respective valve seat, and means including an element enclosed within said casing for slidable movement between said sets of valve members whereby each set may alternatively be shifted and maintained away from the valve seats of its respective valve members.

10. In a valve mechanism, the combination of a casing having passages therein and enclosing two sets of valve members movable to open or closed positions relative to said passages, means exerting pressure on each of said valve members for constantly urging the latter toward a closed position, an element within said casing slidable between said sets of valve members and engageable with one or the other sets thereof for shifting the same to an open position, and means operatively associated with said element holding the same stationary at substantially each end of the possible movement thereof for maintaining the valve members engaging said element in open position.

PAUL VAN SITTERT.